(12) United States Patent
Sampson

(10) Patent No.: US 10,863,264 B2
(45) Date of Patent: Dec. 8, 2020

(54) VIBRATION INDUCING TACTILE APPARATUS

(71) Applicant: David Sampson, Los Angeles, CA (US)

(72) Inventor: David Sampson, Los Angeles, CA (US)

(*) Notice: Subject to any disclaimer, the term of this patent is extended or adjusted under 35 U.S.C. 154(b) by 0 days.

(21) Appl. No.: 15/878,400

(22) Filed: Jan. 23, 2018

(65) Prior Publication Data

US 2018/0213321 A1    Jul. 26, 2018

Related U.S. Application Data

(60) Provisional application No. 62/449,295, filed on Jan. 23, 2017.

(51) Int. Cl.
| | |
|---|---|
| H04R 1/40 | (2006.01) |
| G06F 3/01 | (2006.01) |
| H04R 1/22 | (2006.01) |
| H04R 1/02 | (2006.01) |
| H04R 1/28 | (2006.01) |
| A47C 7/72 | (2006.01) |
| A47C 21/00 | (2006.01) |

(52) U.S. Cl.
CPC ............. *H04R 1/403* (2013.01); *G06F 3/016* (2013.01); *H04R 1/227* (2013.01); *A47C 7/727* (2018.08); *A47C 21/006* (2013.01); *A61H 2201/0142* (2013.01); *A61H 2201/0149* (2013.01); *H04R 1/025* (2013.01); *H04R 1/2803* (2013.01); *H04R 2201/403* (2013.01); *H04R 2400/03* (2013.01)

(58) Field of Classification Search
CPC ...... H04R 1/025; H04R 1/227; H04R 1/2803; H04R 2201/403; H04R 2400/03; G06F 3/016; A47C 1/00; A47C 7/727; A61H 2201/0142; A61H 2201/0146; A61H 21/006
USPC ............... 381/333, 151, 152, 105; 297/217.4
See application file for complete search history.

(56) References Cited

U.S. PATENT DOCUMENTS

| | | |
|---|---|---|
| 5,035,235 A | 7/1991 | Chesky |
| 5,113,852 A | 5/1992 | Murtonen |
| 5,132,942 A | 7/1992 | Cassone |

(Continued)

FOREIGN PATENT DOCUMENTS

| | | |
|---|---|---|
| EP | 1325727 | 3/2003 |
| WO | W02000002516 | 1/2000 |

*Primary Examiner* — Christopher R Harmon
(74) *Attorney, Agent, or Firm* — Edwin Tarver

(57) ABSTRACT

A vibration inducing tactile apparatus is configured for introducing audio-based vibrations into them body of a user. The apparatus includes a housing, with the housing having a top panel for supporting the user. A digital sound processor is installed in the housing, with the digital sound processor in communication with a controller. The housing further includes a speaker array and a low pass filter in communication with the digital sound processor, with the low pass filter in communication with a primary amplifier. A speaker array is driven by a secondary amplifier, and a first transducer and a second transducer are driven by the primary amplifier. The digital sound processor modifies a first signal sent to the first transducer relative to a second signal sent to the second transducer, such that the audio-based vibrations have resonating frequencies and are transferred from the apparatus to the user.

13 Claims, 10 Drawing Sheets

(56) References Cited

U.S. PATENT DOCUMENTS

| | | |
|---|---|---|
| 5,473,700 A | 12/1995 | Fenner |
| 6,175,981 B1 | 1/2001 | Lizama et al. |
| 6,369,312 B1 * | 4/2002 | Komatsu ................. G10H 1/00 |
| | | 381/150 |
| 6,544,165 B1 * | 4/2003 | McNew ............ A61M 21/0094 |
| | | 600/27 |
| 7,442,174 B2 * | 10/2008 | Butler ................. A61H 23/0236 |
| | | 601/15 |
| 7,981,063 B1 | 7/2011 | Butler |
| 7,981,064 B2 | 7/2011 | Oser et al. |
| 8,617,089 B2 | 12/2013 | Oser et al. |
| 8,761,417 B2 | 6/2014 | Oser et al. |
| 8,804,093 B2 | 8/2014 | Haight et al. |
| 8,971,546 B2 * | 3/2015 | Millington ............. H04L 12/282 |
| | | 381/77 |
| 2004/0021351 A1 * | 2/2004 | House ................... B60N 2/879 |
| | | 297/217.4 |
| 2007/0081679 A1 * | 4/2007 | Suzuki ................... H04R 15/00 |
| | | 381/152 |
| 2007/0223771 A1 | 9/2007 | Butler |
| 2009/0270774 A1 * | 10/2009 | Gowda ............. A61H 23/0236 |
| | | 601/47 |
| 2012/0313765 A1 | 12/2012 | Oser et al. |
| 2014/0114120 A1 | 4/2014 | Oser et al. |
| 2015/0190396 A1 | 7/2015 | Krueger et al. |
| 2016/0242995 A1 | 8/2016 | Karkkainen |

* cited by examiner

Speaker Matrix options

VIBRATION INDUCING TACTILE APPARATUS

RELATED APPLICATIONS

This application claims the benefit of the priority filing date of U.S. provisional patent application Ser. No. 62/449,295, which was filed on 23 Jan. 2017 and is incorporated herein by reference in its entirety.

BACKGROUND

The present system and method generally relates to tactile audio. More specifically, the present system and method relates to tuned vibration inducing tactile audio.

Tactile audio transducers are known in the art and have been used for entertainment, and as part of a vibrational therapy regimen for both health and pleasure. Certain improvements in the art have included altering the frequency of an audio signal processed through such a transducer to alter the effect on the user experiencing its vibrations. This may include 'scanning' a frequency up and down a predetermine Hz range to achieve the desired effect. While the processes known in the art contemplate two or more transducers used simultaneously, they are limited to identical Hz ranges, or signals confined to a predetermined set of different Hz ranges.

Thus what is needed is an apparatus for providing two or more transducers, which allows a user to 'tune' one frequency relative to another frequency for a desired effect, and which receives feedback from the output frequencies to analyze those frequencies and provide equalization, compression, and phase variation. Those, and additional objects of the present invention are more specifically set forth in the appended summary, description and claims.

SUMMARY

In a first embodiment, the apparatus comprises a vibration inducing tactile apparatus for introducing audio-based vibrations to a user. The apparatus includes a housing, with the housing including a top panel configured for supporting the user. A digital sound processor is installed in the housing, with the digital sound processor in communication with or otherwise controlled by a controller. The housing also includes a speaker array and a low pass filter in communication with the digital sound processor. In one embodiment the low pass filter is incorporated into, and is a part of the digital sound processor.

The low pass filter is in communication with a primary amplifier, and a speaker array is driven by a secondary amplifier. A first transducer and a second transducer are driven by the primary amplifier, wherein the digital sound processor modifies a first signal sent to the first transducer relative to a second signal sent to the second transducer according to user-controlled settings in the controller, such that the audio-based vibrations have resonating frequencies and are transferred from the apparatus to the user.

In various embodiments, the housing may comprise an enclosure at least partially encasing the first transducer and the second transducer. Preferably, the controller comprises a mobile device application in wireless communication with the digital sound processor for ease of operation, and the speaker array comprises speakers arranged on opposing sides of the housing, with the speakers wired for stereo sound.

In a preferred embodiment, the first transducer and the second transducer are coupled to the top panel such that a transmission of vibrations from the first transducer and the second transducer to the top panel are maximized. The controller is configured to cause the first transducer and the second transducer each to emit a frequency varying from 0.1 Hz to 3000 Hz, including similar or identical frequencies according to user preference, although preferably, a range of 10 Hz to 200 Hz is desired because vibrations above 200 Hz are difficult to detect, and vibrations under 10 Hz may tend to overheat the transducers 52/54. Preferably, the controller or digital signal processor is configured to generate a sine wave sweep through the frequencies to determine resonant frequencies of a user by way of microphone and/or accelerometer feedback analysis.

In one variation of the apparatus, characterized as a tactile gaming surface, additional transducers are provided, with the top panel comprising four corners, such that the transducers are arranged proximal each of the four corners and centrally under the top panel. In such a configuration, a four-speaker speaker array may be provided, with a speaker disposed proximal each of the four corners.

In an alternative embodiment, the apparatus may be characterized as a vibration inducing tactile bed apparatus for introducing audio-based vibrations to a user through a cushion or mattress on the bed. In such an embodiment, the apparatus includes a bed-shaped housing, with the housing having a top panel for accommodating the cushion, and the cushion configured to support the user in a prone position. A digital sound processor is installed in the housing, with the digital sound processor in communication with a controller, and the housing also includes a speaker array and a low pass filter in communication with the digital sound processor.

The low pass filter is in communication with a primary amplifier, and a speaker array is driven by a secondary amplifier. A first transducer and a second transducer are driven by the primary amplifier, and the digital sound processor is configured to modify a first signal sent to the first transducer relative to a second signal sent to the second transducer according to user-controlled settings in the controller, such that the audio-based vibrations have resonating frequencies and are transferred from the apparatus to the user.

The housing may comprise an enclosure at least partially encasing the first transducer and the second transducer (i.e., disposing them inside the bed). Preferably, the controller comprises a mobile device application in wireless communication with the digital sound processor, and the speaker array comprises speakers arranged on opposing sides of the housing, the speakers wired for stereo sound.

The first transducer and the second transducer are coupled to the top panel such that a transmission of vibrations from the first transducer and the second transducer to the top panel are maximized, and the controller is configured to cause the first transducer and the second transducer each to emit a frequency varying from 0.1 Hz to 3000 Hz. Similar to other embodiments, preferably, the controller or digital signal processor is configured to generate a sine wave sweep through the frequencies to determine resonant frequencies of a user by way of microphone and/or accelerometer feedback analysis.

In yet another alternative embodiment, the apparatus may be characterized as a vibration inducing tactile chair apparatus for introducing audio-based vibrations to a user through a cushion on the bed. In such an embodiment, the apparatus includes and is constructed as a chair having a seat portion and a back portion, with the chair configured to support the user in a sitting position. A digital sound processor is installed on or in the chair, with the digital sound processor in communication with a controller to be controlled by a user. A low pass filter is in communication with the digital sound processor, and as with alternative embodiments, the low pass filter may be incorporated into the digital sound processor.

The low pass filter is in communication with a primary amplifier, and a first transducer and a second transducer are driven by the primary amplifier, wherein the digital sound processor modifies a first signal sent to the first transducer relative to a second signal sent to the second transducer according to user-controlled settings in the controller, such that the audio-based vibrations have resonating frequencies and are transferred from the apparatus to the user. Preferably the first transducer and the second transducer are each configured to sweep through the resonating frequencies, and the first transducer is affixed to the seat portion of the chair while the second transducer is affixed to the back portion of the chair. In one alternative embodiment, the chair may include a speaker array incorporated into the chair, including the seat and the back.

DETAILED DESCRIPTION

Figure 1:
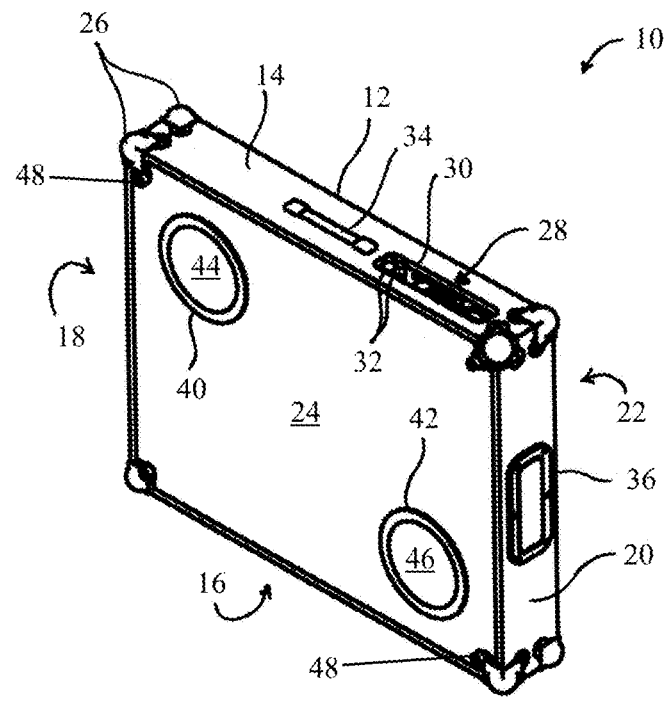
FIG. 1 illustrates a perspective view of a vibration inducing tactile system.
Figure 2:
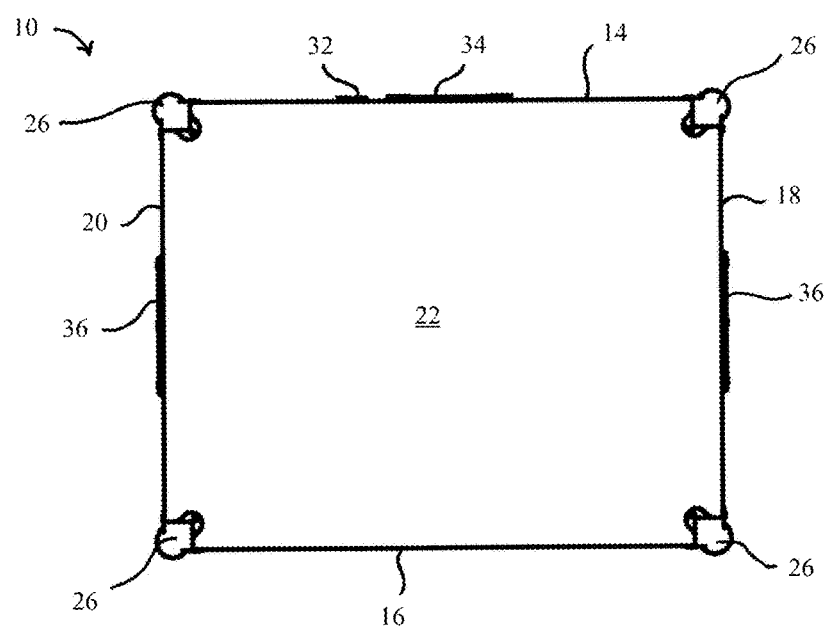
FIG. 2 illustrates a top plan view of the system, including a platform for accommodating a standing user.
Figure 3:
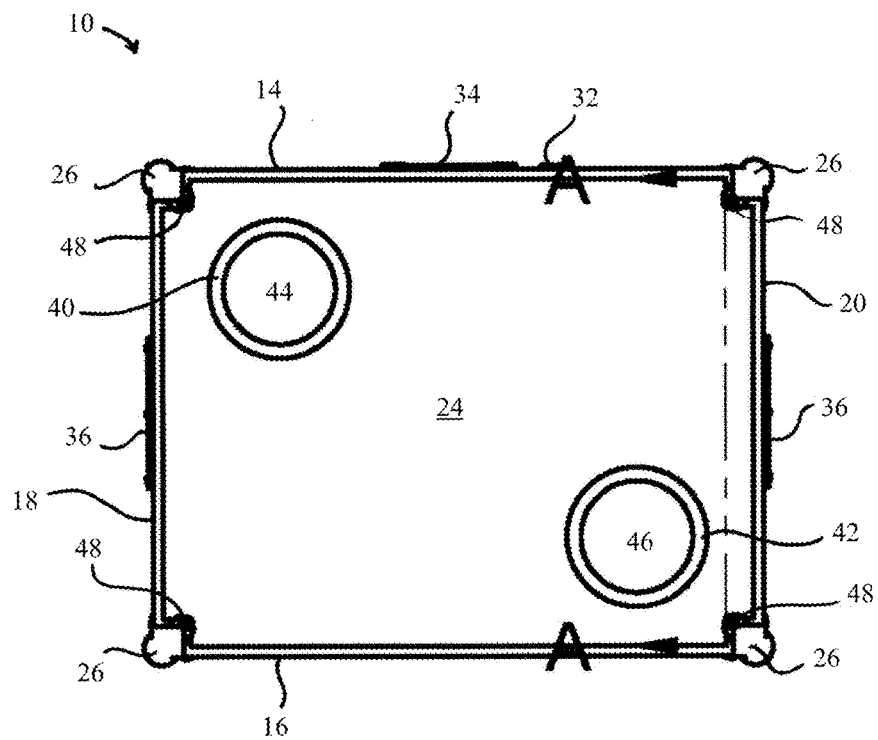
FIG. 3 illustrates a bottom plan view of the system, including full range speakers.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Referring to FIGS. 1-5, in a primary embodiment, the apparatus comprises a substantially three-dimensionally rectangular housing 12. The housing 12 is characterized by a front panel 14, a rear panel 16, a first side panel 18, a second side panel 20, a top panel 22, and a bottom panel 24. Each of the front panel 14, rear panel 16, first side panel 18, second side panel 20, top panel 22 and bottom panel 24 are preferably disposed at ninety-degree angles to each other, such that a series of corner guards 26 can be placed over corners (not shown) of the apparatus 10 for protection, in the manner of conventional music equipment cases. Although a substantially rectangular embodiment is shown, it should be recognized that virtually any shape apparatus 10 having a substantially planar top panel 22 on which a person may stand, can be employed.

The housing 12 is further characterized by the front panel 14 preferably having a control interface 28 for controlling the apparatus, which may be mounted in a control window 30, and recessed to protect the controls 32 of the apparatus 10. In one embodiment, the front panel 14 also includes a handle 34 near or adjacent the control window 30, the handle adapted for easily carrying the apparatus 10 with the top panel 22 and bottom panel 24 vertical to the user.

Since the front panel 14 typically faces forward relative to a user (i.e., 'downstage'), the rear panel 16 may incorporate a plug (not shown) or similar power supply designed to arrange cords away from the apparatus 10. The first side panel 18 and the second side panel 20 are preferably substantially similar, each comprising a horn speaker port 36 behind which a horn speaker 38 is mounted. The horn speaker ports 36 and horn speakers 38 may be installed, as illustrated, in the first side panel 18 and the second side panel 20, respectively for reproducing stereo sound. The top panel 22 preferably presents a substantially planar surface atop which a user may stand. Since the top panel 22 is the surface through which vibrations reach the user, the top panel 22 preferably comprises a material of appropriate tensile strength for transmitting vibrations at a variety of frequencies and amplitudes.

The underside of top panel 22 preferably includes a first transducer 52 and a second transducer 54. In alternative embodiments, a single, or three or more transducers may be used according to preference. The first transducer 52 and the second transducer 54 are preferably installed as far away from one another as possible, to maximize a user's ability to detect changing or altered differences in frequency and amplitude between the first transducer 52 and the second transducer 54.

The bottom panel 24 preferably includes a first speaker port 40 and a second speaker port 42 for accommodating a first full range speaker 44 and a second full range speaker 46. In alternative embodiments, a single, or three or more speakers may be used according to preference. The first full range speaker 44 and the second full range speaker may be installed proximal the horn speakers 38 on the first side panel 18 and the second side panel 20 to enhance stereo sound reproduction. A series of feet 48 or spacers are preferably provided to elevate the apparatus 10 from a surface on which it rests, and to provide space for any portion of the first speaker 44 or second speaker 46 protruding from the bottom panel 24.

Figure 4:
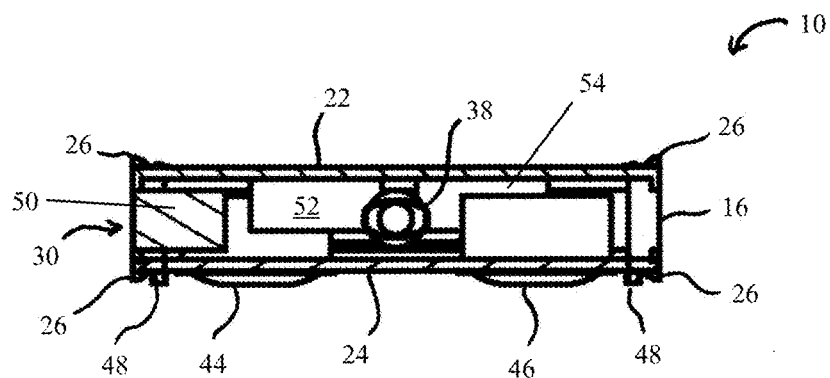
FIG. 4 illustrates a cut-away side view of the system, including internal speakers, transducers, and other components.
Figure 5:
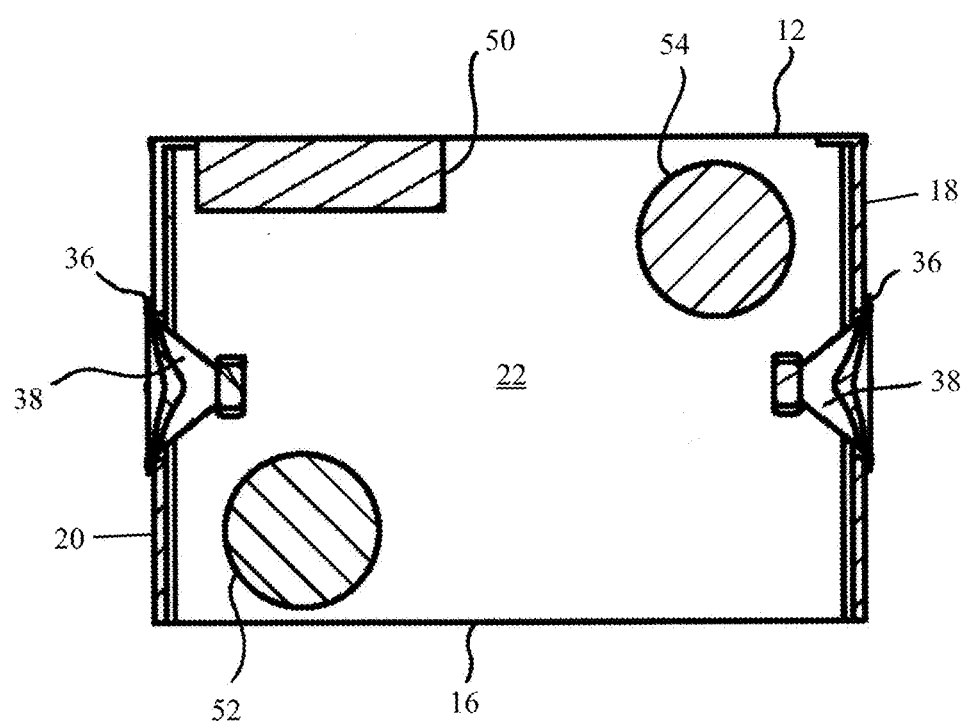
FIG. 5 illustrates a cut-away plan view of the system, including internal speakers, transducers and other components.

Referring to FIGS. 4-5, the interior of the apparatus 10 is shown. The control interface, including a digital sound processor 56, a primary amplifier 64 and a secondary amplifier 66 (FIG. 6) are preferably housed in a control housing 50 mounted against the front panel 14. The control housing 50 may include additional internal features supporting various controls 32 including line out, headphone jack(s), equalization features, volume control, headphone amp, input interface, and power supply, etc., to exist as an integrated unit. As shown in FIG. 4, preferably the first transducer 52 and the second transducer 54 are mounted against the top panel 22, to provide maximum vibration transmission to a user, while the first full range speaker 44 and the second full range speaker 46 are mounted against the bottom panel 24 for emitting sound from underneath the apparatus 10. In alternative embodiments, it should be understood that the first transducer 52, second transducer 54, first full range speaker 44, and second full range speaker 46 may be placed in any arrangement according to preference.

Figure 6:
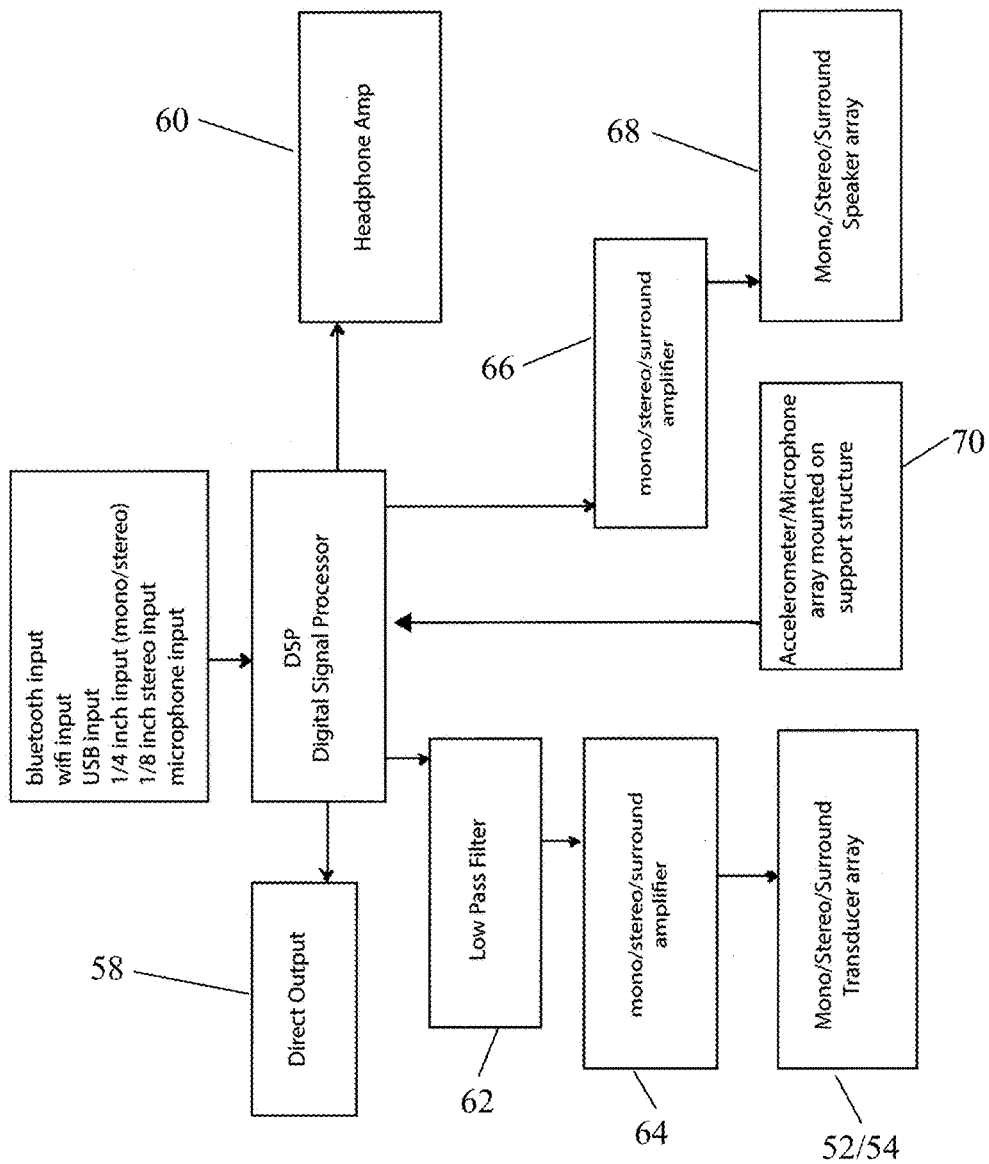
FIG. 6 illustrates a flow chart diagram of the system and its components.

Referring to FIG. 6, a flowchart diagram displays the flow of signal through the apparatus 10. Primary audio signal is fed to the digital signal processor 56 in the control housing 50, and may come, for example, from a Bluetooth® input, WiFi input, USB input, a one quarter inch (mono stereo) audio jack, or an eighth inch (mono/stereo) audio jack, among others. The digital signal processor 56 may provide a direct output 58 such as a 'line out' to external peripheral apparatus, and may also provide a headphone amp 60 and connector for accepting a headphone jack.

Still referring to FIG. 6, the digital signal processor 56 processes the signal through a low pass filter (LPF) 62, which may be controlled by the control interface 28, but preferably is controlled by a digital source, such as a mobile device app, to allow more precise control of the LPF 62. Additionally, the LPF 62 may be incorporated into the digital sound processor 56, or may be a stand-alone filter as shown in the diagram. From the LPF 62, the altered signal proceeds to a primary amplifier 64, which, may be a mono, stereo, or surround sound amplifier, and from the primary amplifier 64, proceeds to the first transducer 52 and the second transducer 54. The digital signal processor 56 also outputs the primary audio signal it receives to a secondary amplifier 66. The secondary amplifier 66 transmits appropriately amplified signal to a speaker array 68, which may comprise the horn speakers 38, the first full range speaker 44 and the second full range speaker 46, or may be one or more alternative speaker systems, which may be mono, stereo, or surround sound speakers.

Figure 7:
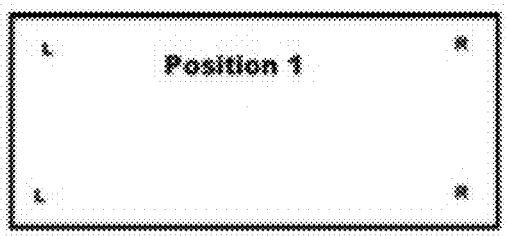
FIG. 7 illustrates a top plan view of various speaker matrix placement arrangements in the apparatus.
Figure 7:
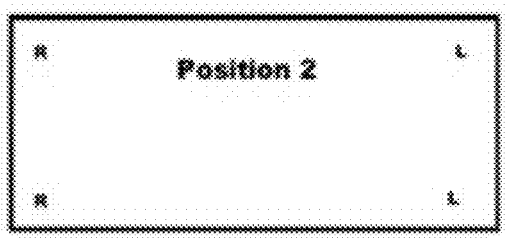
Figure 7:
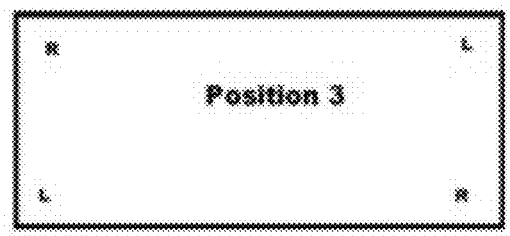
Figure 7:
Figure 7:
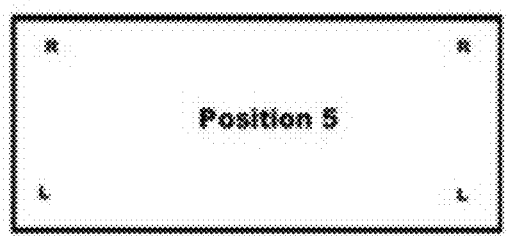
Figure 7:
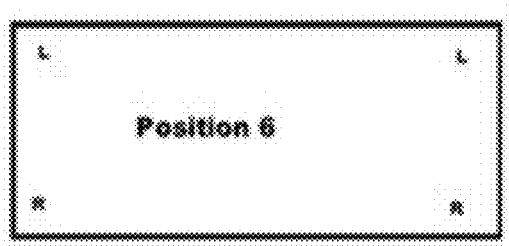

Referring to FIG. 7, various left/right arrangements of the speaker array are shown featuring different speaker matrix options according to user preference.

An accelerometer/microphone array 70 is provided and may be mounted on the apparatus on the bottom of support surface 22 to detect audio coming from the LPF-associated first transducer 52 and second transducer 54, to provide feedback, thus allowing a user to set particular parameters and adjust the tone frequency and frequency modulation. With the aid of an associated mobile device application, the apparatus 10 can create oscillating waves stored as presets, as well as enhance bass frequencies and pitch shift according to user preference.

In order to use the apparatus 10, a user places the apparatus 10 in an appropriate location, and provides power to the apparatus. The user may operate the controls 32 to adjust volume and other sound processing features available on the control interface 28. The user then selects an input signal to be fed to the digital signal processor 56, for example by selecting and playing an audio track from a mobile device application. Alternatively, any electrified musical instrument may be used as audio input. The user also may use the mobile device application to set the parameters of the LPF 62. Signal going through the digital sound processor 56 may also be output to the direct output and/or the headphone amp 60 according to preference.

The digital signal processor 56 transmits the signal through the secondary amplifier 66, which transmits the signal, preferably unfiltered, to the speaker array 68, which may be the horn speakers 38, the first full range speaker 44 and the second full range speaker 46 (or any alternative speaker array 68 according to preference). Simultaneously, the digital signal processor 56 transmits the signal through the LPF 62, where it is altered according to user-set parameters governed by the mobile device app. The altered signal is then transmitted to the primary amplifier 64 and to the first transducer 52 and the second transducer 54. Using the mobile device app, the user may set microtonal tuning differences between the Left and Right signals of the first transducer 52 and the second transducer 54. Those differences can preferably be saved by the app. The accelerometer/microphone array 70 transmits signal back to the digital signal processor 56 which analyzes the feedback frequency and uses equalization, compression, and phase variation, to even the frequency response of the apparatus 10.

The accelerometer/microphone array 70 may comprise multiple surface mount microphones or accelerometers mounted on the underside of the apparatus 10, including the top panel 22. A sine wave frequency sweep is generated from the digital processor 56 or external sound source, such as a mobile phone application or computer. The microphone/accelerometer array 70 registers the amplitude of frequencies as they sweep through a range of 0.1 hz to 3000 hz. The digital signal processor 56 uses equalization, compression, and/or phase shifting to attenuate the apparatus 10 to an even frequency response. Once the apparatus 10 is tuned so that there is an even frequency response, the apparatus 10 is capable of determining a person's resonant frequencies when standing, laying, or sitting on the apparatus 10. By comparing the resulting resonance with a person standing, sitting or prone on the apparatus 10 with the even frequency response of the apparatus 10, the program can generate an audio signal to accentuate resonant frequencies of the body or diminish resonant frequencies of the body based on analysis of resulting amplitude variations.

Referring to FIGS. 8-12, an alternative embodiment apparatus 100 configured as a bed is shown. In various other alternative embodiments the apparatus may comprise additional items of furniture, such as a chair, lounge, etc. In such embodiments, the mobile device app preferably functions more as a tone generator and biofeedback module, which provides an oscillating tonal massage for a user seated in the apparatus 100.

Figure 8:
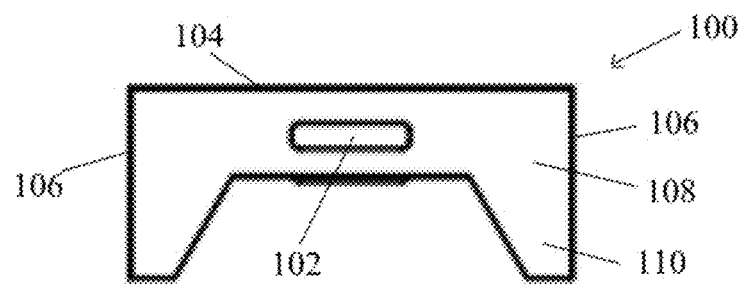
FIG. 8 illustrates a side elevation view of a second embodiment of the apparatus configured as a bed.
Figure 9:
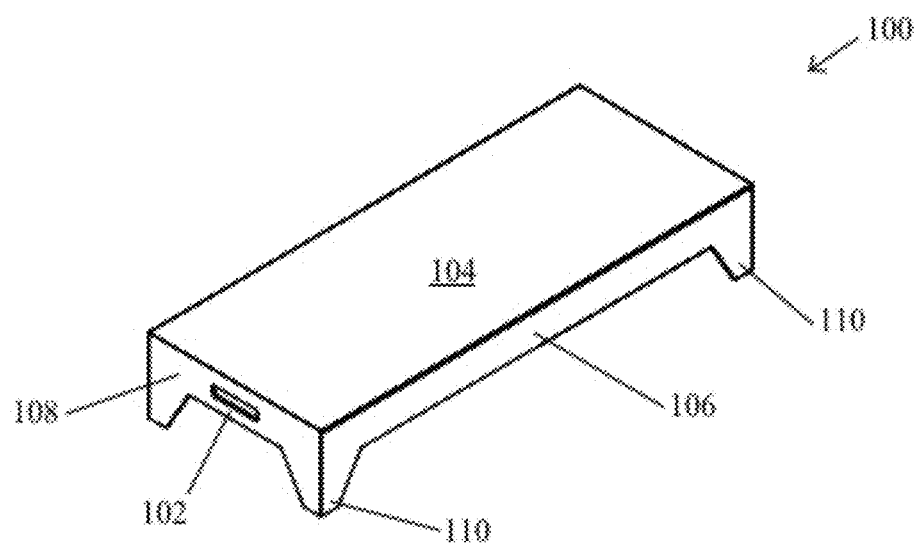
FIG. 9 illustrates a top perspective view of the second embodiment.

Referring to FIG. 8, the apparatus 100 includes a control window 102 on the head or foot of the bed, in which various controls (not shown) may be installed, allowing a user to easily control the apparatus 100. Alternatively, according to preference, the control window may be on the side or underneath the apparatus 100 according to preference. Referring to FIG. 9, the apparatus 100 includes a top surface 104 which is the primary surface on which a mattress or similar support may rest. In use, the user is preferably positioned across the top surface 104 to experience vibrations from the apparatus 100 across the user's body. The apparatus 100 also includes side portions 106, head/foot portions 108 (including the control window 102), and legs 110 for supporting the apparatus 100 similar to a conventional bed.

Figure 10:
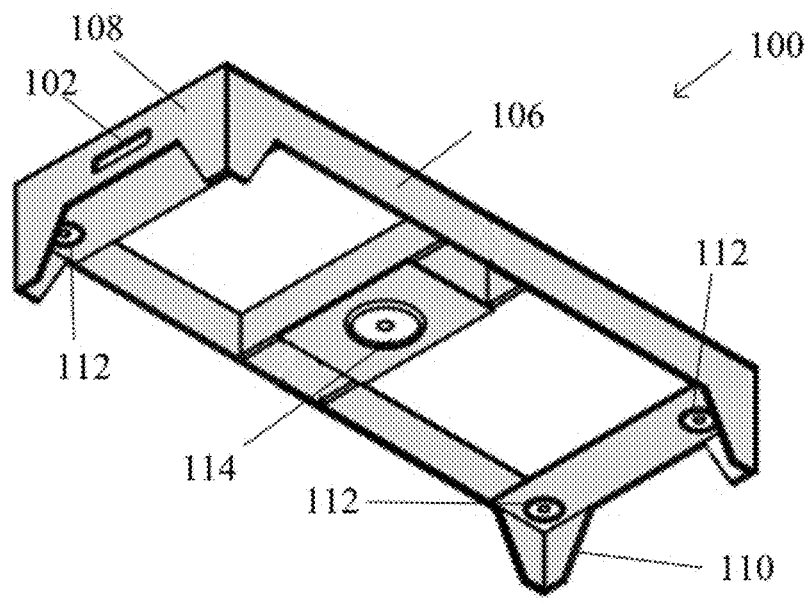
FIG. 10 illustrates a bottom perspective view of the second embodiment.
Figure 11:
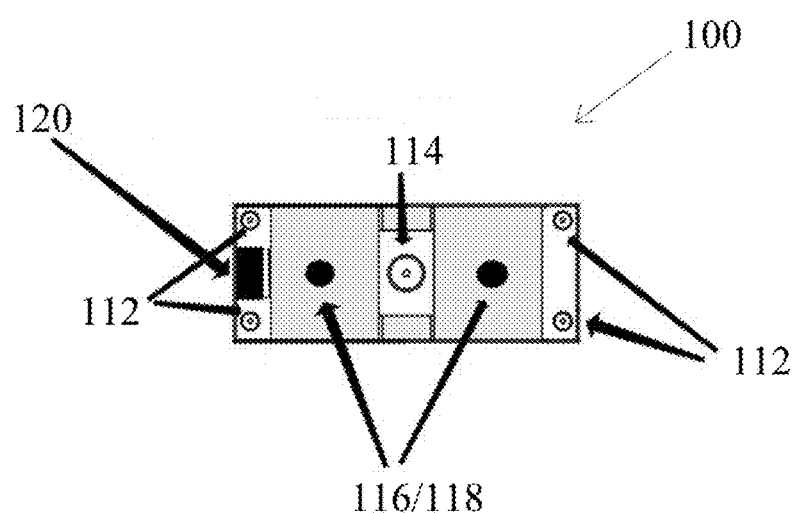
FIG. 11 illustrates a bottom plan view of the second embodiment.
Figure 12:
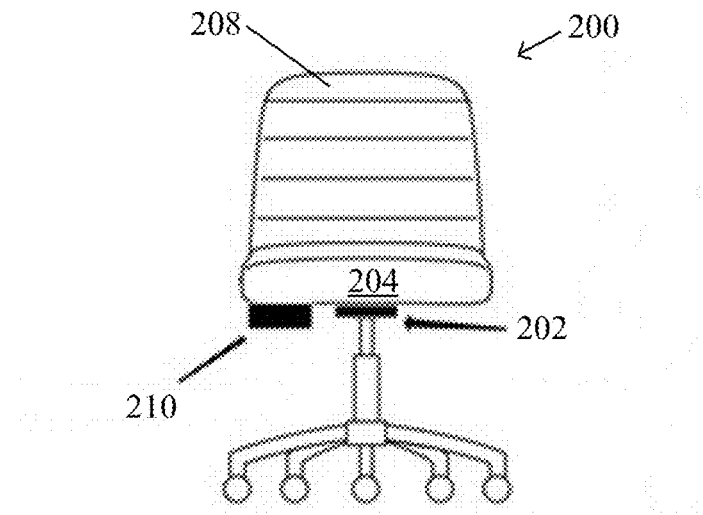
FIG. 12 illustrates a front elevation view of a third embodiment of the apparatus configured as a chair.
Figure 13:
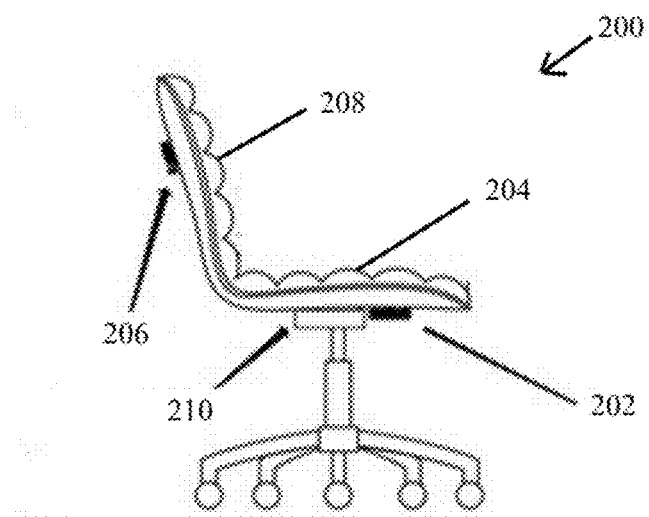
FIG. 13 illustrates a side elevation view of the third embodiment.

Referring to FIGS. 10 and 11, the underside of the apparatus 100 includes it operational features, including full range speakers 112, a sub-woofer 114, a first transducer 116, a second transducer 118, and an integrated electronics unit 120 for controlling them. In one preferred embodiment, the integrated electronics unit 120 is positioned adjacent the control window 102 so the controls are accessible by the user. The integrated electronics unit 120 may include a microphone array (not shown), or the microphone array may comprise microphones positioned at various locations across the apparatus 100. Using the controls, a user can tune the apparatus 100 in a manner similar to the first embodiment apparatus 10, Frequencies preferably between 0.1 Hz and 3000 Hz are generated and transmitted through the first transducer 116. Sensors in the furniture may capture biofeedback data from a user's heartbeat, breath, temperature in different areas of the body, voice, and electromagnetic emissions, all of which may be wirelessly transmitted to the app.

The application can preferably make adjustments according to a desired effect (or dependent on the aforementioned biofeedback parameters). Exemplary adjustments include adjusting tonal frequencies, adjusting modulation of frequencies between tactile points, storing tonal presets, operating on a timer, operating as an alarm clock, and returning sonic, tonal or visual stimuli based on the biofeedback information. Preferably the mobile device application includes a media player capable of enhancing bass frequencies and shifting media pitch to accommodate users frequency preferences.

In various alternative embodiments, the apparatus may include an adjustable EQ filter sending prescribed frequencies to tactile output. In surround applications this system has a speaker matrix control which will switch the left/right orientation in six different ways. In conventional stereo applications, the matrix controls the traditional left and right stereo orientation. In four speaker configurations, the matrix gives six options for stereo placement. In surround applications, the matrix controls the front, rear, left, right orientation.

In the alternative, i.e., furniture, embodiment, a support structure other than a platform is used, which may consist of one or more tactile transducers fitted below the load bearing surface of the furniture in question, such as a support with felt or high density foam to allow fee vibration of a load bearing surface thereunder.

Figure 14:
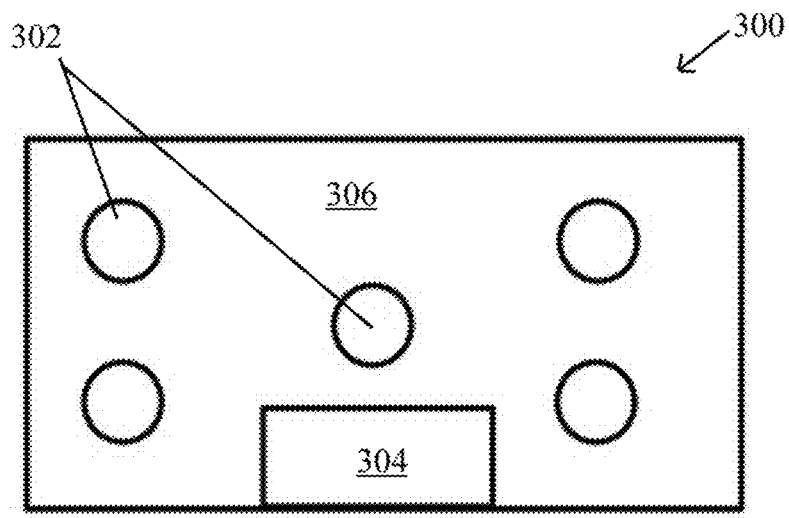
FIG. 14 illustrates a bottom plan view of a forth embodiment of the apparatus configured as a tactile gaming surface.
Figure 15:
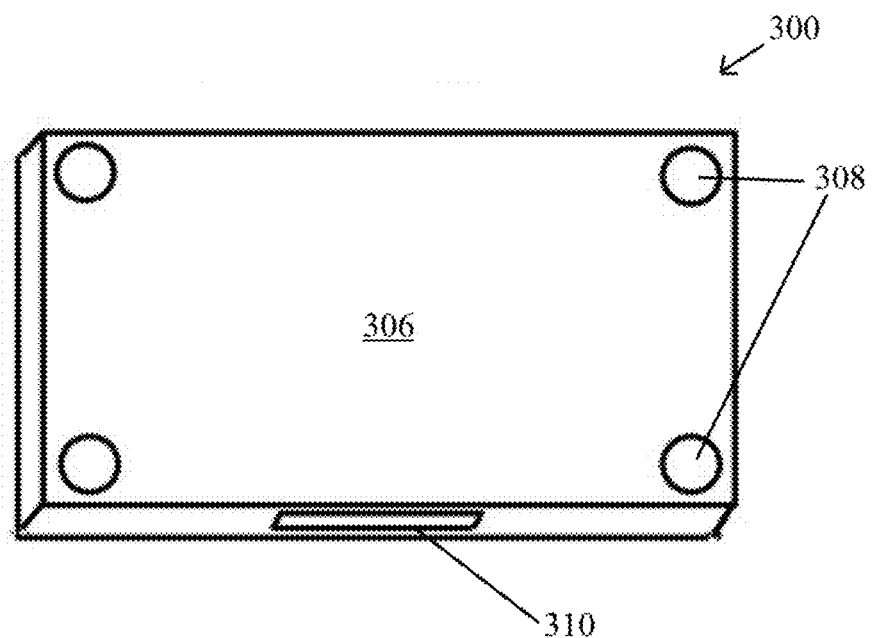
FIG. 15 illustrates a perspective top view of the fourth embodiment.

As shown in 12 and 13, another alternative embodiment apparatus 300 is formed as a chair having a first transducer 202 in the seat of the chair 204, a second transducer 206 in the back of the chair 206, and an integrated electronics unit in a control housing 210 for controlling them. As shown in FIGS. 14 and 15, yet another alternative embodiment apparatus 300 is configured as a gaming surface. FIG. 14 illustrates the positions of five transducers 302 to accompany surround-sound audio, and a controller 304 placed under the top surface 306 a user sits on. FIG. 15 illustrates the top of the top surface 306, with speakers 308 placed in the four corners for providing surround sound, and the control window 310 for adjusting the controller 304. In all, the apparatus can be expressed as beds and chairs, as well as flooring, pedestals, five pointed tactile gaming surfaces, and modular dance floors. Preferably, electronics are shielded with nickel alloy foil or another other substance to shield users from electromagnetic fields generated by the transducers, power supply, amplifier and wireless receiver.

Figure 16:
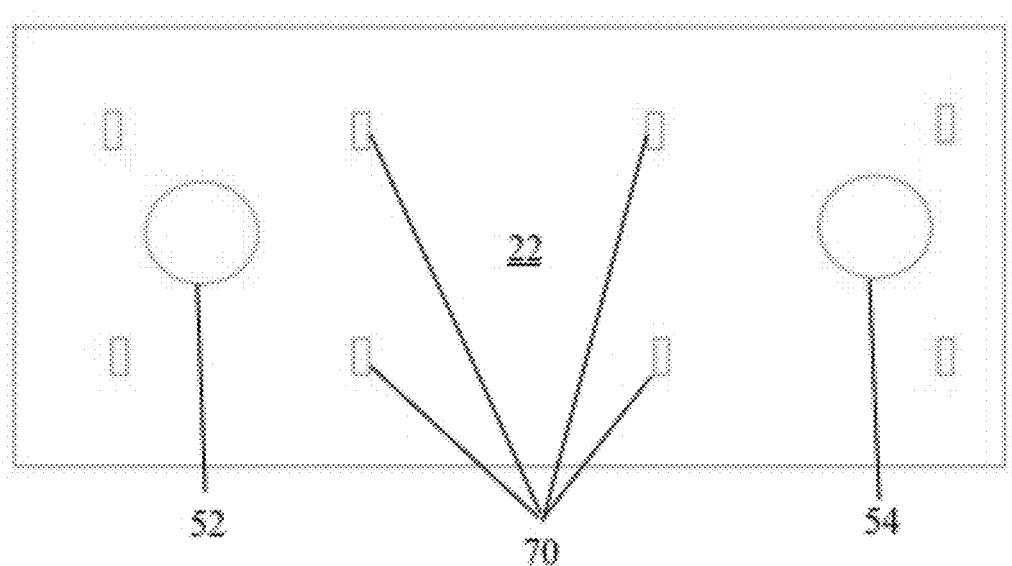
FIG. 16 illustrates a bottom side of a support structure having an accelerometer/microphone array installed thereon.

Referring to FIG. 16, in all embodiments the microphone array 70 may be arranged around the first transducer 52 and the second transducer 54 for providing appropriate feedback and adjustment of transducer frequencies. The illustrated embodiment shows one such microphone array 70.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A vibration inducing tactile bed apparatus for introducing audio based vibrations to a user through a cushion on a bed, the apparatus comprising:
   a housing, the housing having a single planar top panel for accommodating the cushion, the cushion configured to support the user in a prone position, and a bottom panel including a first speaker port and a second speaker port;
   the housing further comprising a series of feet configured to elevate the bottom panel above a surface;
   a digital sound processor installed in the housing, the digital sound processor in communication with a controller;
   the housing further comprising a speaker array installed in the first speaker port and the second speaker port, the speaker array in communication with the digital sound processor, and a low pass filter in communication with the digital sound processor;
   the low pass filter in communication with a primary amplifier;
   the speaker array driven by a secondary amplifier; and
   a first transducer and a second transducer driven by the primary amplifier, wherein the digital sound processor modifies a first signal sent to the first transducer relative to a second signal sent to the second transducer according to user-controlled settings in the controller, such that the audio-based vibrations have resonating frequencies and are transferred from the apparatus to the user; and
   an accelerometer array affixed to the housing, the accelerometer array configured to detect a sine wave frequency sweep generated from the digital sound processor, register the amplitude of frequencies in the site wave frequency sweep, and provide feedback to the sound processor for modifying the sine wave frequency sweep.

2. The apparatus of claim 1 wherein the housing comprises an enclosure at least partially encasing the first transducer and the second transducer.

3. The apparatus of claim 1 wherein the controller comprises a mobile device application in wireless communication with the digital sound processor.

4. The apparatus of claim 1 wherein the speaker array comprises speakers arranged on opposing sides of the housing, the speakers being wired for stereo sound.

5. The apparatus of claim 1 wherein the first transducer and the second transducer are coupled to the top panel such that a transmission of vibrations from the first transducer and the second transducer to the top panel are maximized.

6. The apparatus of claim 1 wherein the controller is configured to cause the first transducer and the second transducer each to emit a frequency varying from 0.1 Hz to 3000 Hz.

7. The apparatus of claim 6 wherein the first transducer and the second transducer are each configured to sweep through the resonating frequencies.

8. A vibration inducing tactile chair apparatus for introducing audio based vibrations to a user through a cushion on a chair, the apparatus comprising:
- a chair having a seat portion and a back portion, the chair configured to support the user in a sitting position;
- the seat portion comprising a housing having a first speaker port and a second speaker port;
- a digital sound processor installed in the housing, the digital sound processor in communication with a controller;
- the housing further comprising a speaker array installed in the first speaker port and the second speaker port, the speaker array in communication with the digital sound processor, and a low pass filter in communication with the digital sound processor;
- the low pass filter in communication with a primary amplifier; and
- a first transducer and a second transducer driven by the primary amplifier, wherein the digital sound processor modifies a first signal sent to the first transducer relative to a second signal sent to the second transducer according to user-controlled settings in the controller, such that the audio-based vibrations have resonating frequencies and are transferred from the apparatus to the user; and
- an accelerometer array affixed to the chair, the accelerometer array configured to detect a sine wave frequency sweep generated from the digital sound processor, register the amplitude of frequencies in the site wave frequency sweep, and provide feedback to the sound processor for modifying the sine wave frequency sweep.

9. The apparatus of claim 8 wherein the first transducer and the second transducer are each configured to sweep through the resonating frequencies.

10. The apparatus of claim 8 wherein the chair further comprises a speaker array incorporated into the seat portion of the chair.

11. The apparatus of claim 8, wherein the first transducer is affixed to the seat portion of the chair, and the second transducer is affixed to the back portion of the chair.

12. A vibration inducing tactile bed apparatus comprising:
- a housing configured for supporting a person;
- a transducer array affixed to the housing;
- a speaker array affixed to the housing; and
- a digital sound processor comprising an input, a direct output, a low pass filter output, an amplifier output, and a headphone amplifier output;
- the headphone amplifier output in electronic communication with a headphone amplifier;
- the amplifier output in electronic communication with a first amplifier;
- the first amplifier in electronic communication with the speaker array;
- the low pass filter output in electronic communication to a low pass filter;
- the low pass filter in electronic communication with a second amplifier;
- the second amplifier in communication with the transducer array;
- an accelerometer affixed to the housing, the accelerometer configured to detect microtonal tuning differences output by the transducer array;
- wherein the digital signal processor input is configured to receive an input signal, and transmit an output signal to the direct output, the low pass filter, the amplifier output, and the headphone amplifier output; and
- wherein the digital signal processor is further configured to receive an accelerometer signal from the accelerometer based on the microtonal tuning differences, analyze a feedback frequency based on the microtonal tuning differences, modify the output signal and re-transmit the output signal.

13. The apparatus of claim 12 wherein the transducer array comprises a speaker.

* * * * *